(12) United States Patent
Hanna

(10) Patent No.: US 7,003,986 B2
(45) Date of Patent: Feb. 28, 2006

(54) FIBERIZING BUSHINGS AND METHODS OF USING

(75) Inventor: Terry Joe Hanna, Millersport, OH (US)

(73) Assignee: Johns Manville International, Inc., Denver, CO (US)

(*) Notice: Subject to any disclaimer, the term of this patent is extended or adjusted under 35 U.S.C. 154(b) by 544 days.

(21) Appl. No.: 10/092,761

(22) Filed: Mar. 6, 2002

(65) Prior Publication Data

US 2003/0167802 A1 Sep. 11, 2003

(51) Int. Cl.
*C03B 37/085* (2006.01)

(52) U.S. Cl. .............................. 65/499; 65/471; 65/475; 65/492; 65/495; 65/DIG. 4; 373/28

(58) Field of Classification Search .................. 65/471, 65/474–476, 481, 492, 495–499, 511, 512, 65/DIG. 4; 373/28
See application file for complete search history.

(56) References Cited

U.S. PATENT DOCUMENTS

| | | | | |
|---|---|---|---|---|
| 3,512,948 A | * | 5/1970 | Glaser et al. .................. | 65/499 |
| 3,589,879 A | * | 6/1971 | Yantsev ........................ | 65/499 |
| 4,026,689 A | * | 5/1977 | Higginbotham ............... | 65/499 |
| 4,272,271 A | | 6/1981 | Thompson | |
| 4,717,411 A | | 1/1988 | Fowler | |
| 4,740,224 A | * | 4/1988 | Fowler ......................... | 65/493 |
| 6,065,310 A | | 5/2000 | Higginbotham et al. | |
| 6,070,437 A | | 6/2000 | Sanik et al. | |
| 6,196,029 B1 | * | 3/2001 | Melia et al. ................... | 65/499 |
| 6,427,492 B1 | * | 8/2002 | Sullivan et al. ............... | 65/495 |

FOREIGN PATENT DOCUMENTS

WO   WO 01/7427 A1   10/2001

* cited by examiner

*Primary Examiner*—Eric Hug
(74) *Attorney, Agent, or Firm*—Robert D. Touslee

(57) ABSTRACT

Electrical resistant bushings and methods for making fibers such as glass fibers by passing molten glass through these bushings to form fibers wherein the bushings have novel ears for attaching to electrical terminal clamps bringing electrical current to the bushing are disclosed. The novel ears have at least one generally V shaped notch at or near the unattached end of the ear to produce an improved temperature profile on the tip plate of the bushing. One preferred bushing of the invention has ears having 5 generally V shaped notches therein.

32 Claims, 9 Drawing Sheets

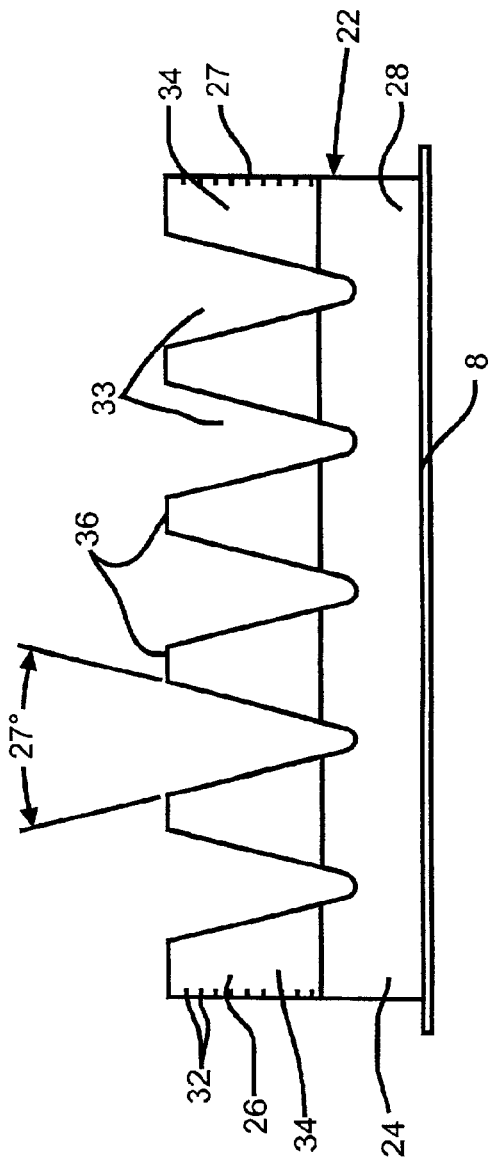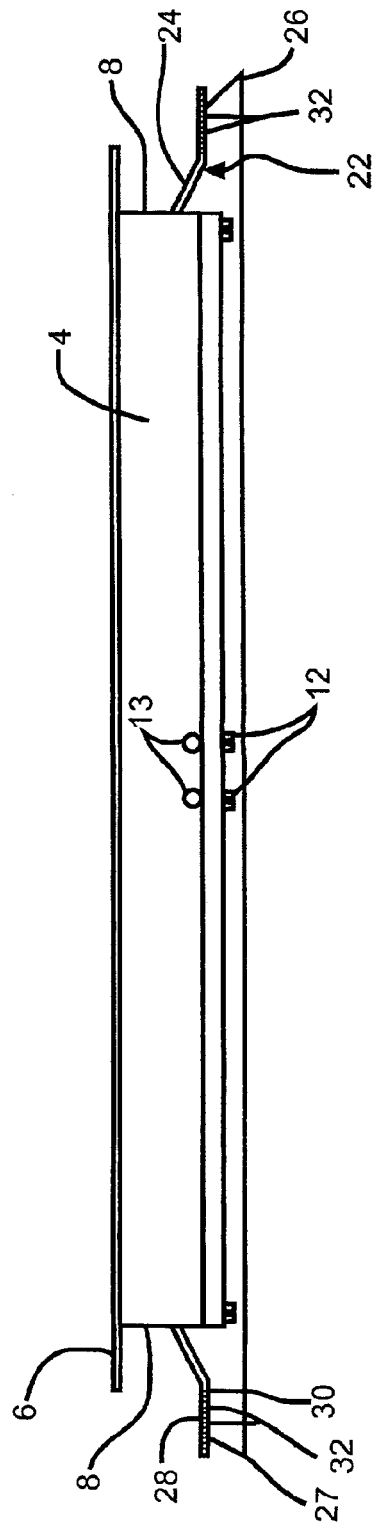

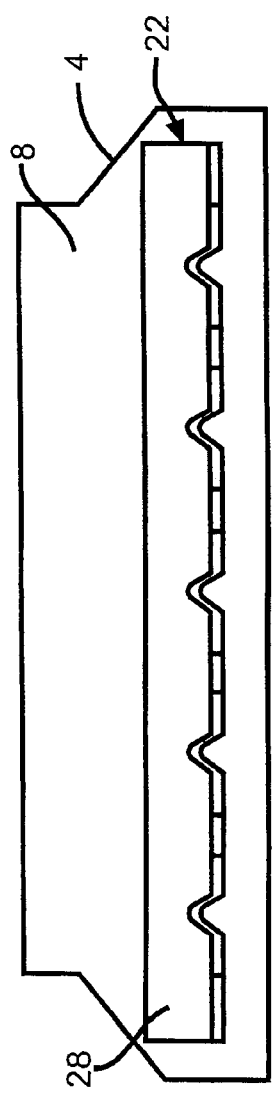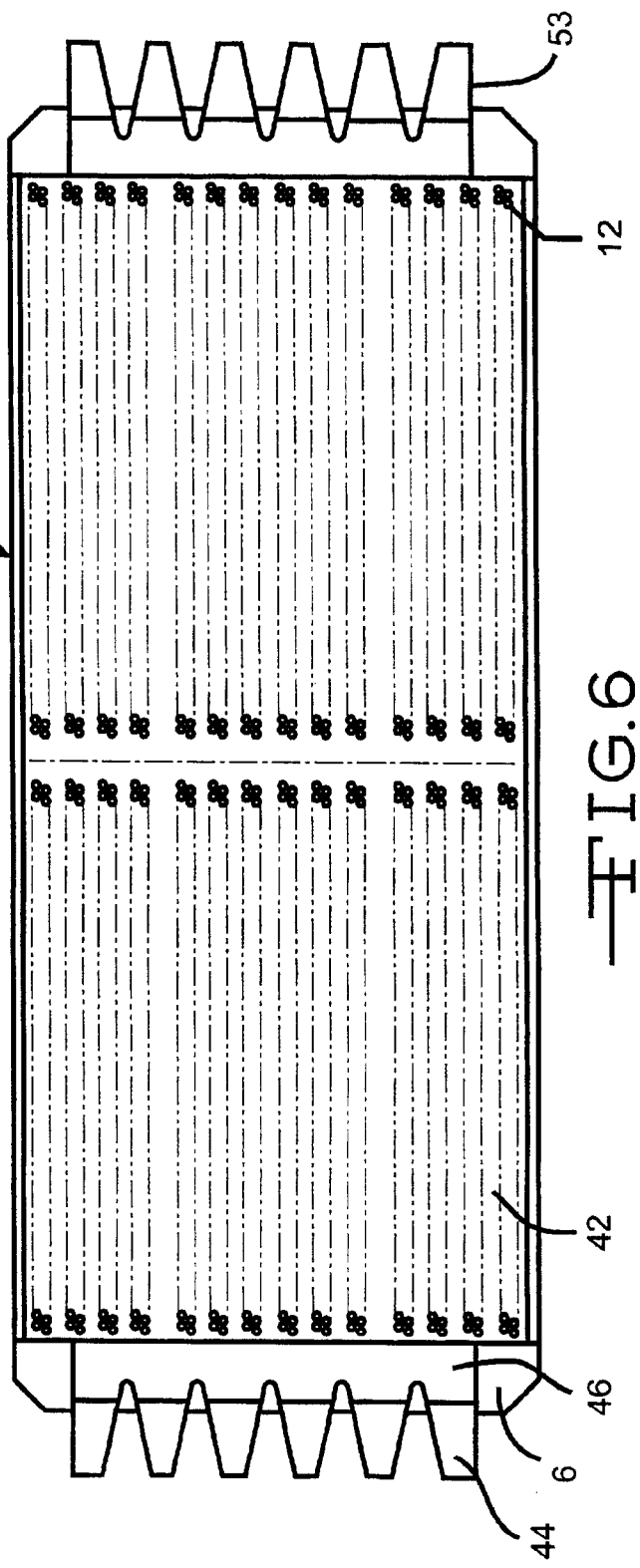

FIBERIZING BUSHINGS AND METHODS OF USING

TECHNICAL FIELD

The present invention involves electrical resistance heated fiberizing bushings and a method of their use in the process of making fibers from a molten material such as making glass fibers from molten glass or other fibers from their molten state. More particularly, the present invention involves a fiberizing bushing having an improved terminal connector or ear for connecting a fluid cooled terminal carrying electrical current to the bushing.

BACKGROUND

In the manufacture of fibers from molten material, such as molten glass, it is normal practice to use electrically resistance heated fiberizing bushings which, in a simplified description, are electrically heated, open top boxes made of a well known precious metal alloy such as platinum/rhodium and having a plurality of nozzles in a bottom plate through which the molten material flows through to form molten meniscuses from which fibers are drawn. An electrical current is passed through each precious metal alloy bushing to heat the bushing and the molten glass flowing into the bushing. The bushings have one or more electrical connectors or ears on each end of the bushing to which is attached a water cooled terminal connector in a known manner. Such bushings are described in detail in U.S. Pat. Nos. 4,740,224 and 6,196,029.

The terminal connector is typically water cooled to protect the copper metal of the terminal connector from the high temperature, usually in the range of 2000 to about 2400 degrees F. of the endwall and tip plate of the bushing. A typical terminal connector is described in detail in U.S. Pat. No. 4,294,502.

Because the terminal connector is water cooled and thus at a temperature much lower than end plates of the bushing, the terminal connectors have a substantial cooling effect on the endwalls of the bushing, the end portions of the tip plate and the glass in the end portions of the bushing. The farther away from the endwall of the bushing that the terminal connector is attached to the bushing ear, the lower the cooling effect on the endwall, and vice versa. Because of differing environmental conditions surrounding each bushing and the different temperatures of the glass flowing into each bushing from the forehearth, it is necessary to be able to adjust the position of the terminal connectors along the length of the bushing ears to obtain a the best uniformity of temperature profile along the length of the bushing tip plate practical. Tip plate temperature uniformity is most important to fiberizing efficiency, to both time and material efficiency.

It is conventional to water cool the terminal connector to protect the copper metal it is made of from overheating and deforming. This cooling of the terminal ear has a detrimental cooling effect on the terminal ear of the bushing and must be offset by the electrical heating of the ear. It is well known that the cross sectional area of the precious metal terminal ear has an effect on the amount of cooling and heating of the ear by the electrical current passing through the ear at the point of connection, which heating must more than offset all of the cooling effect of the cold terminal connector. It has been common practice in the past to taper the ear or ears on each end of the bushing such that as the distance from the unattached end of the ear increases, the cross sectional area of the ear also increases. This can be seen in the bushings described in detail in U.S. Pat. Nos. 4,272,271, 6,065,310, 6,070,437 and 6,196,029.

One problem that often occurs with this type of ear is cold corners of the tip plate because this ear design does not distribute the current uniformly to the end wall and tip plate insufficient power is distributed to the corners of the end wall and tip plate. In these ear designs, it often occurs, and most frequently in developmental bushings or newly developed bushings, that the range of adjustment provided by these prior art ear designs is inadequate and does not allow one to achieve a uniform temperature profile across the length of the tip plate. A bushing ear design having a greater range of adjustment is therefore needed to minimize "cold corners" in the orifice plate or tip plate and to provide an improved temperature profile over the entire orifice plate or the tip plate of the bushings.

SUMMARY OF THE INVENTION

The present invention includes an electrically resistant-heated fiberizing bushing made from an electrically conductive material and comprising an orifice plate or a tip plate, a wall attached to each end or side of the tip plate or orifice plate and one or more terminal ears (ears) integral with or attached to the external surface of a wall of the bushing for attaching to an electrical terminal clamp, each ear having an increasing cross sectional area along a portion of its length from the unattached end portion towards the wall, the improvement comprising that each ear contains at least one generally V-shaped opening or notch at or near the unattached end of the ear with the wide part of the V being at or near the unattached end of the ear. Preferably the bushing will have two opposing sidewalls and two opposing endwalls, but can have one continuous wall forming a closed shape like a circle, oval, etc. Preferably each ear will have at least two generally V-shaped openings or notches. Also, a V-shaped pattern of small openings in the ear can produce the same or similar effect as a generally V shaped notch. Also, the ears of the bushings of the present invention can have a combination of generally V shaped notches or openings and one or more other openings having one or more other shapes such as round, oval, long oval, slots, and other shapes that do not have a detrimental effect on the current flow to the wall.

The present invention further includes electrically resistant-heated fiberizing bushings made from an electrically conductive material and comprising an orifice plate or a tip plate, one or more walls attached to the tip plate or orifice plate and two or more electrical connecting ears (ear) integral with or attached to the external surface of opposing ends or walls of the bushing. Normally the bushing would have two opposing sidewalls and two opposing endwalls, but bushings are known which have a single wall in the shape of a circle, oval, etc. Each ear is for attaching to a conventional electrical terminal clamp, typically fluid cooled. Each ear has an increasing cross sectional area along a portion of its length from the unattached end of the ear towards the endwall, the improvement comprising that each ear has two or more, such as three or more, four or more, five or more, six or more, etc. generally V-shaped notches with the wide part of the V's beginning in an end portion close to or adjacent the unattached end of the ear and extending towards the endwall or sidewall to which the ear is attached. The number of notches, the included angle(s) of the notches, the length or lengths of the notches, the radius or radii of the bottoms of the notches, the distance between the centerline of each notch closest to a side of the ear and the side of the ear and the distance between centerlines of the notches can vary depending upon the width of the bushing, the number of ears on each bushing and other bushing design features to eliminate cold corners, to simplify terminal block/clamp designs and to provide a superior temperature profile across the length and width of the tip plate of the bushing. Preferably, for a bushing having about 4000 nozzles, only one ear is used on each end of the bushing and the ear has three or more notches, most preferably four or more notches, such as five or six notches.

The notches need not all be of the same shape or depth, but preferably they are. The notches are wider at or near, and preferably open, on the unattached end of the ear, but the notch(es) need not be open at the unattached end. Preferably the sides of each notch join each other at the bottom of the notch, preferably in a radius, which occurs in the ear at a location spaced from the endwall of the bushing. The ear can be planar or not planar in a known manner. The width of the ear can change along its length, i. e. the outside edges of the ear can be tapered, at least in the portion where the terminal clamp attaches to the ear, but preferably the width of the ear does not change along its length. The ear can also change in thickness along its length, but preferably is of a single thickness.

The present invention also includes a method of making fibers from a molten material by passing a molten material through electrically resistant-heated, inventive, fiberizing bushings, as described above, e. g. made from an electrically conductive material and comprising an orifice plate or a tip plate, one or more sidewalls attached to the sides of the tip plate and an endwall attached to each end of the tip plate or orifice plate and the sidewalls and two or more electrical connecting terminal ears (ear) integral with or attached to the external surface of opposing endwalls or sidewalls of the bushing, each ear for attaching to an electrical terminal clamp, each ear having an increasing cross sectional area along at least a portion of its length from the unattached end portion of the ear towards the endwall or sidewall to which it is attached, the improvement comprising that each ear has one or more generally V shaped notches beginning in an end portion close to or adjacent the unattached end of the ear and extending towards the endwall or sidewall to which the ear is attached. The number of notches, the included angle in the notches, the length of the notches, the radius or radii of the bottoms of the notches, the distance between the centerline of each notch closest to a side of the ear and the side of the ear and the distance between centerlines of the notches can vary depending upon the width of the bushing, the number of ears on each bushing and other bushing design features to eliminate cold corners, to simplify terminal clamp designs and to provide a superior temperature profile across the length and width of the tip plate of the bushing. The method of the present invention involves using the inventive bushings having the inventive ears described above in the method above described above for making fiber from a molten material like glass.

With the present invention, the cross sectional area of the ear, in the notched portion, usually changes along the length of the notched portion at a substantially greater rate than some prior art ear designs and has a substantially greater range of change than other prior art ear designs, i. e. begins with a lower crossectional area and ends with a greater cross sectional area in the portion designed to be in contact with the terminal connecting clamp. This greater range of change in cross sectional area at the clamping location provides a greater range of cooling or heating effect on the ends of the bushing and end portions of the tip plate or orifice plate of the bushing, allowing adjustment of the location of the terminal clamp to achieve a more uniform temperature profile of the tip plate or orifice plate over a wide range of bushing environments and a resulting higher bushing efficiency, both time and material efficiency, for a group of bushings attached to the forehearth of a furnace, or for a bushing attached to a single bushing melting unit. The present inventive bushing can also minimize the amount of valuable precious metal alloy required for a bushing, regardless of the size of the bushing, providing a secondary valuable benefit.

By the term "generally V-shaped notch(s)" is meant a notch or notches whose sides will eventually intersect, if extended far enough, prior to reaching an endwall, and whose sides lie between the sides of the bushing ear. When the term "tip plate" is used alone, it is also to be understood that it is meant to include an orifice plate in the alternative.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without unexpected characteristics, those embodiments are within the meaning of the term about as used herein. It is not difficult for the skilled artisan or others to determine whether such an embodiment is either as might be expected or, because of either a break in the continuity of results or one or more features that are significantly better than reported by the inventor, is surprising and thus an unobvious teaching leading to a further advance in the art.

DESCRIPTION OF THE DRAWINGS OF THE PREFERRED EMBODIMENTS

FIG. 3A is an enlarged plan view of one inventive ear on the bushing shown in FIG. 3.

FIG. 4 is a front view of the inventive bushing shown in FIG. 3.

FIG. 5 is a partial end view of the inventive bushing shown in FIGS. 3 and 4.

FIG. 6 is a bottom view of another preferred embodiment of the inventive fiberizing bushing of the present invention showing inventive bushing ears.

DETAILED DESCRIPTION OF PREFERRED EMBODIMENTS

Figure 1:
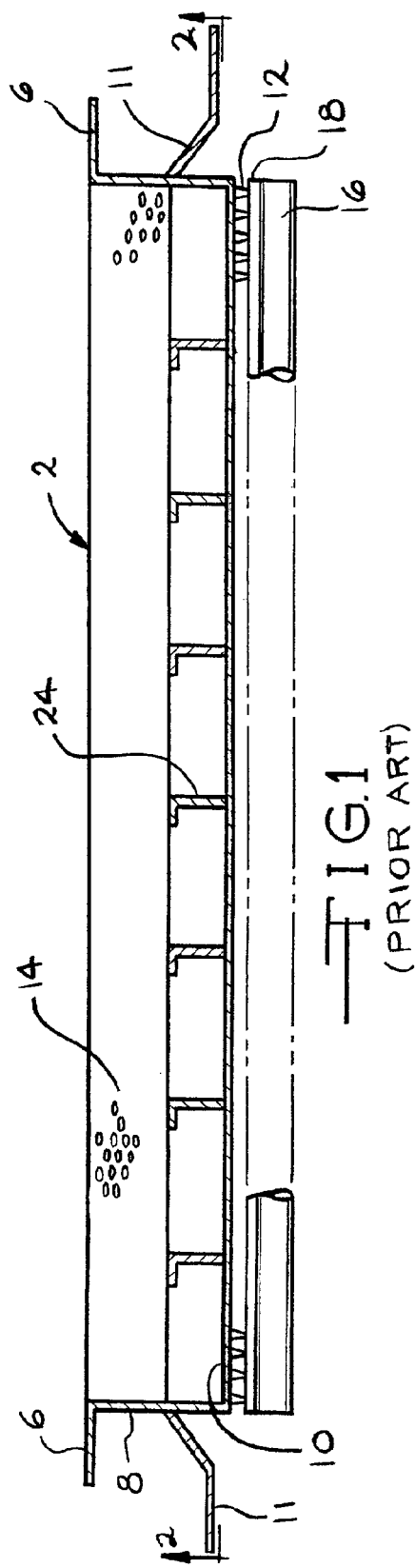
FIG. 1 is a front view of a prior art bushing having a front sidewall removed to see the interior of the bushing and having a conventional ear design.
Figure 2:
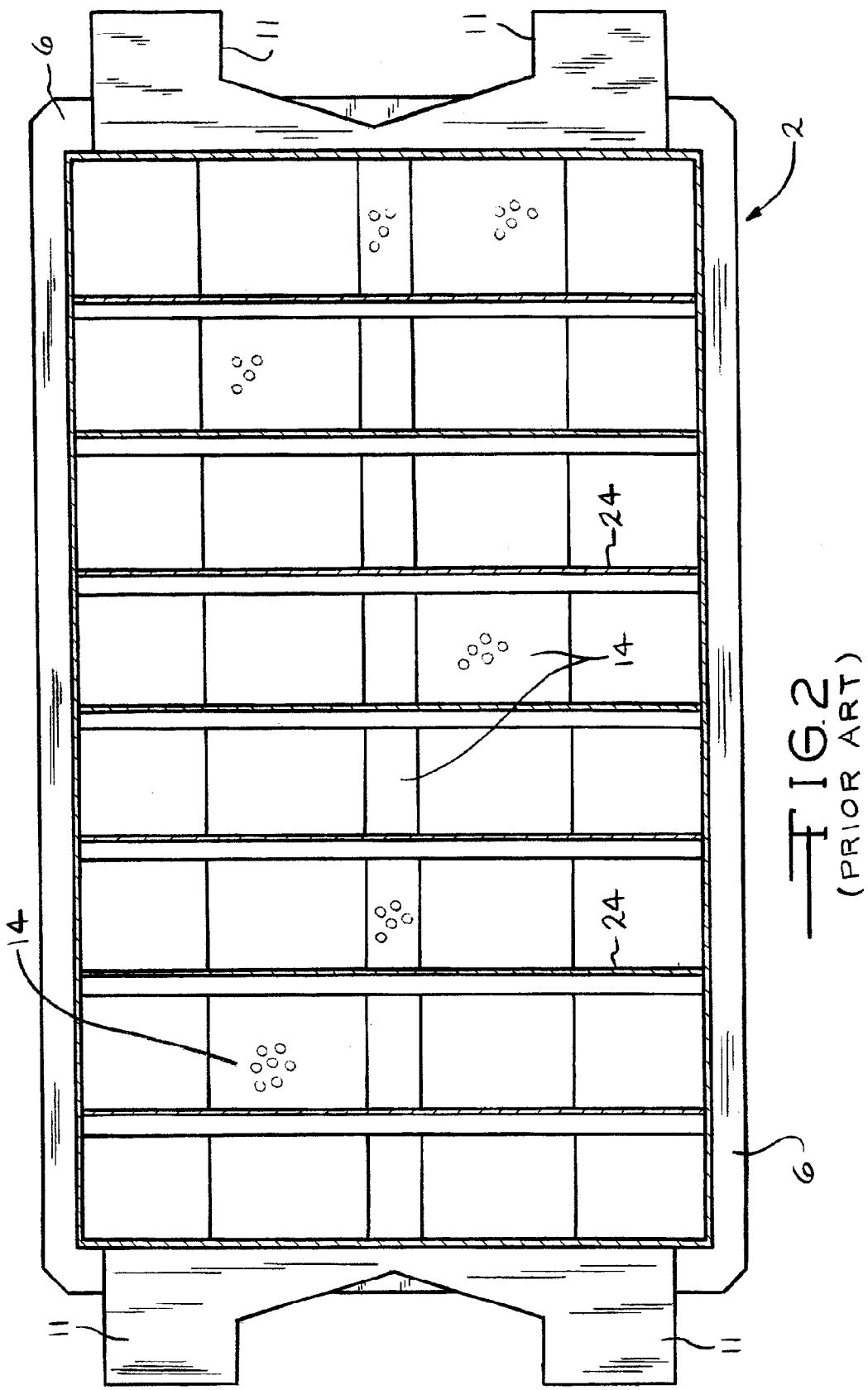
FIG. 2 is a horizontal crossectional view of the prior art bushing shown in FIG. 1 taken along lines 2—2 of FIG. 1.

A typical large (2000 or more tips) prior art fiberizing bushing is shown in FIGS. 1 and 2. FIG. 1 is a front vertical view with the closest sidewall removed to show the interior of a typical prior art precious metal bushing 2 and related hardware used to form glass fiber from molten glass. FIG. 2 is a crossectional view along lines 2—2 of FIG. 1.

The bushing is made from a platinum/rhodium alloy having a rhodium content ranging from ten to about thirty percent, typically 20–25 percent. The bushing 2 comprises two sidewalls 4 (only one is shown), a flange 6 that extends around the entire upper periphery of the bushing and that is welded to the upper edges of the sidewalls 4 and the upper edges of two endwalls 8, an orifice or tip plate 10 having rows of orifices (not shown) welded to the sidewalls 4. Tips or nozzles 12 centered around the orifices are either integral with or welded to the orifice plate 10. A bushing electrical connector (ear) 11 is welded to the exterior of each end wall 8 for connecting the bushing 2 to electrical power in a known manner, typically with a well known conventional water cooled copper terminal clamp connected to a water cooled electric cable (not shown).

Some conventional terminal clamps have three or more bolts forcing two fluid cooled metal plates against the two opposing faces of the outer portion of the bushing ear, i. e. that portion furthest from the endwall of the bushing, but such terminal clamps are substantially heavier than other conventional terminal clamps having only two bolts with one bolt located to be spaced from each side of the ear. A conventional terminal clamp is described in U.S. Pat. No. 4,003,730, the disclosure of which is hereby incorporated herein by reference. Some terminal clamps use other means than bolts to provide the clamping force such as described in U.S. Pat. No. 4,294,502.

Normally, the tips 12 are arranged in rows down the length or the width of the bushing. In the bushings shown here, the tips 12 are arranged in pairs of staggered tip rows, running along the length of the bushing in a known manner, e. g. as shown in U.S. Pat. No. 4,337,075, which disclosure is hereby incorporated by reference. A conventional perforated plate or screen 14 having a plurality of holes therein is mounted to the endwalls 8 and/or sidewalls 4 of the bushing and is spaced above the tip plate 10 for the purposes of catching any pieces of refractory or foreign material coming in with the molten glass from the forehearth and to reduce variations in the temperature of the molten glass passing therethrough.

Normally used with the bushing 2, but not a part of the bushing, are a plurality of cooling tubes 16 spaced below the tip plate 10 and between the double rows of tips 12. The cooling tubes 16 usually have at least one fin 18 on top of the tubes 16 for cooling the tips 12 and molten glass and fibers that are formed at the end of the tips 12 when the bushing is operating. Some of the cooling tubes can have a double fin in a known manner. A ceramic linear support (not shown) lays on each double finned tube in a known manner and extends to the bottom surface of the orifice plate 10 in a known manner to provide support for the orifice plate 10 in the manner disclosed in U.S. Pat. No. 4,356,016, the disclosure of which is incorporated herein by reference. Large bushings use at least one combination fin cooling tube and ceramic support and can utilize two or more such arrangements. The cooling tubes are supported in a well known manner, such as disclosed in U.S. Pat. No. 5,244,483. While the cooling tubes shown here are rectangular with radiused ends in cross-section, they can be oval, round, square, or rectangular, etc. as is well known. The cooling tubes 15 are not essential to the bushings of the present invention as fin shield cooling and other well known means of cooling the tips and fibers can be used with the bushings of the present invention.

The orifice plate 10 is further strengthened internally with a plurality of interior angle shaped reinforcing members 20 running across the width and spaced along the length of the bushing with their bottom edges attached to the orifice plate, usually welded to the top surface of the orifice plate 10 between the double rows of orifices. The internal supports 20 have cutouts (not shown here) above the orifices so as to not impede the flow of molten glass into the orifices.

When the bushing is installed, the upper surface of the flange 6, which extends uninterrupted entirely around the upper periphery of the bushing, will contact, and be held against a conventional orifice block (not shown) in a known manner, with well known devices, also not shown here, on the bottom of a furnace forehearth.

This prior art bushing design is applicable to a wide variety of bushing sizes and types, such as on bushings having up to 4000 or more nozzles or tips. While a typical prior art bushing design is described above, the present invention is applicable to a broad range of electrically heated fiberizing bushings such as those that use cooling fins located between single or double rows of tips which fins branch from liquid cooled manifolds running generally parallel to the length of the bushing or, bushings often called fin-shield bushings. Also, the present invention applies to electrically heated bushings having different screen, internal support, and tip or orifice plate designs than the typical prior art bushing design shown above as all electrically resistant heated bushings have the same need for more uniform tip or orifice plate temperature profile.

Figure 3:
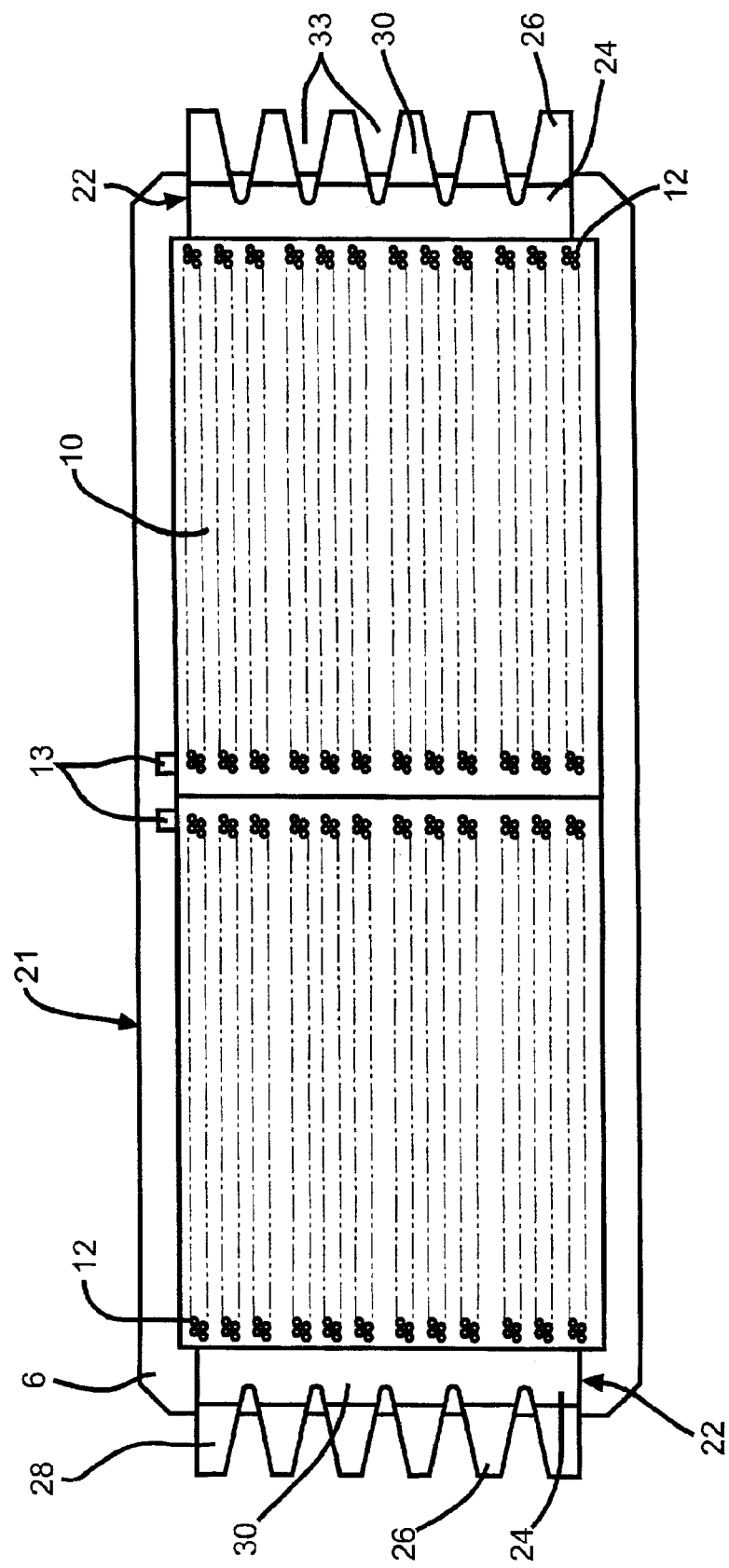
FIG. 3 is a bottom view of a preferred embodiment of the bushing of the present invention.

A preferred embodiment of a fiberizing bushing of the present invention is shown in FIGS. 3–5. As in the prior art bushings described above, bushing 21 is comprised of two opposing sidewalls 4, two opposing endwalls 8, a flange 6 extending around the top of the bushing and attached to the tops of the endwalls 8 and the sidewalls 4, an orifice or tip plate 10, a plurality of spaced apart and staggered double rows of tips 12, and thermocouples 13 used to monitor the tip plate temperature.

Integral with or attached to the exterior of each endwall 8 is an electrical connecting ear (ear) 22. The ear 22 is wider than it is long and preferably is nearly as wide and can be as wide as the width of the endwall 8 at the location that the ear 22 is attached to the endwall 8. The ear 22 is preferably made of the same precious metal alloy as the endwall 8, but can be a different alloy so long as it is electrically conductive. The ear 22 preferably has a single thickness, but could also be comprised of two parts such as a thicker first part attached to or integral with the endwall 8 and a thinner second part 26, the unattached end. The ear could also gradually increase or decrease in thickness along its length. A top surface 28 of the ear 22 and a bottom surface 30 are preferably parallel to each other (see FIG. 4), but need not be. The top surface 28 can be in a single plane, but preferably is not in a single plane, but rather is in two or more planes as shown in FIG. 4.

A vertical centerline of each ear 22 is aligned with a vertical centerline of the endwall 8 it contacts. Each first part 24 of the ear 22 can be perpendicular to the endwall 8, but preferably is at an angle with the endwall 8 as shown in FIG. 4, preferably with the angle between the bottom surface 30 of the ear 22 and the exterior surface of the endwall 8 being less than 90 degrees, most preferably in the range of about 45 to about 75 degrees. However, this angle can also be 90 degrees and the ear can be in one plane or two or more planes. The second part 26 of the ear 22 is preferably parallel to the tip plate 10, but need not be. The sides 27 of the second part 26 are marked with reference marks 32 to aid knowing where a leading edge of a terminal connector (not shown) is located when installing or moving the terminal connector on the ear 22.

The ear of the present invention has at least one V-shaped notch with the widest part of the V being at or near the unattached end of the ear opposite the end of the ear attached to the end plate 8. Preferably, the bottom of the V is radiused, but need not be. The number of the V shaped notches, the angle within the V and and the length of the V can all be varied to obtain the result needed depending on the size of the bushing and the design of the bushing. Side portions 34 of the second part 26 are preferably wider adjacent the wide part of the V shaped notches 33 than the width of ends 36 of the second part 26 between the V-shaped notches 33.

EXAMPLE 1

One preferred bushing was like bushing 21 of FIGS. 3–5. It was fabricated using conventional precious metal alloy forming and welding techniques using an alloy of about 78 percent platinum and about 22 percent rhodium. The bushing was sized in a conventional manner to have about 2580 nozzles or tips. The orifice plate 10 had a thickness of about 1.5 mm and the thickness of the endwalls 8 had a thickness of about 1.4 mm.

The ear 22, welded onto the exterior of each endwall 8 of the bushing 2 is shown enlarged in FIG. 3A. In this Example the ear 22 was made up of the first part 24 that was about 2.54 mm thick and a second part 26 which was also about 2.54 mm thick. The length of the second part 26 is about 28.6 mm long. The reference marks 32 are stamped into the sides 27 of the second part 26 and spaced apart about 3.175 mm. The second part 26 of the ear 22 has five V-shaped notches 33 in the unattached end with the open end of the V at the unattached end. The enclosed angle of the V is preferably about 27 degrees and the bottoms of the V shaped notches, which are in the first part 24, have a radius of about 3/32. The centerline of the center V shaped notch aligns with the side-to-side centerline of the ear 22. The width of the side portions 34 of ear 22 are about 11.1 mm at the unattached end and the width of V shaped notches 33 at the ends 36 of the ear 22 are about 21.6 mm. The width of bushing 21 at tip plate 10 was about 172.1 mm.

The ear 22 is bent to form a 1/8 radius on the top surface 28 between the first part 24 and the second part 26. The length of the ear 22 is such that the unattached ends 36 are about 50.8 mm from the exterior surface of the endwall 8 when the ear 22 is welded to the endwall 8 as shown in FIG. 4. The ear 22 is preferably attached to the end wall 8 with continuous welds to both the top surface 28 of the ear 22 and also to a bottom surface of the ear 22 as shown in FIG. 4. The bottom surface of the first part 24 of the ear 22 preferably makes an angle with the endwall 8 of about 59 degrees.

This bushing having ears 22 as described above performed in a superior manner to prior art bushings having conventional ears in the same positions on a furnace forehearth. The range of control of tip plate temperature profile was greater than prior art bushings allowing improved tip plate temperature uniformity, elimination of cold corners and higher fiber productivity. Also, the ears 22 required several troy ounces less alloy than prior art ears. At a current value of about $647 per troy ounce of 78 percent platinum/ 22 percent rhodium alloy, this improvement amounts to capital savings of hundreds of thousands of dollars to the glass fiber industry.

Figure 6A:
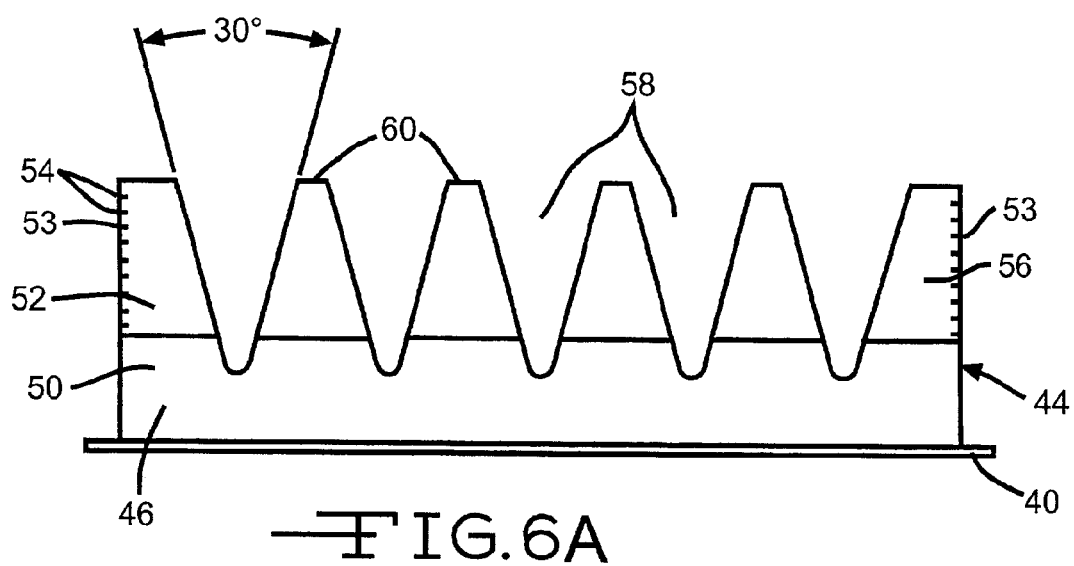
FIG. 6A is an enlarged plan view of one of the inventive ears on the bushing shown in FIG. 6.
Figure 7:
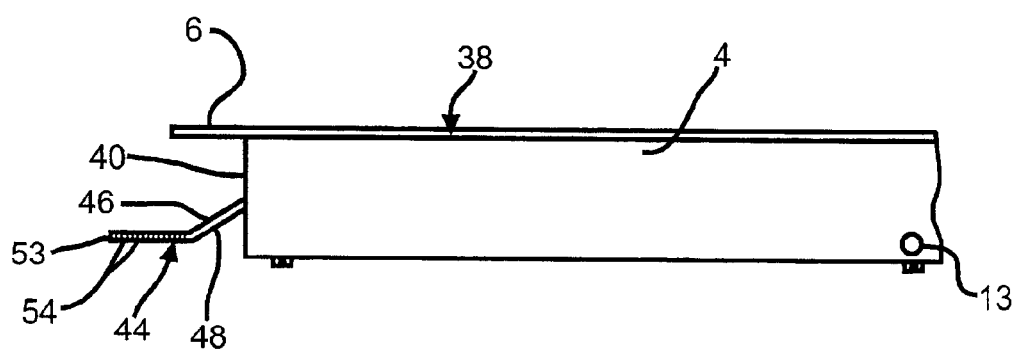
FIG. 7 is a partial front vertical view of about one half of the bushing shown in FIG. 6.

Another preferred embodiment of a fiberizing bushing of the present invention is shown in FIGS. 6, 6A and 7. This bushing is larger than the bushing shown in FIGS. 3–5 having about 4030 tips 12 in 16 double rows of tips 12. As in the prior art bushings described above, bushing 38 is comprised of two opposing sidewalls 4, two opposing endwalls 40, a flange 6 extending entirely around the top of the bushing and attached to the tops of the endwalls 40 and the sidewalls 4, an orifice or tip plate 42, thermocouple ports 13 and a plurality of spaced apart double rows of tips 12.

Integral with or attached to the exterior of each endwall 40 is an ear 44. The ear 44 is wider than it is long and preferably is nearly as wide as the width of the endwall 40 at the location that the ear 44 is attached to the endwall 40. The ear 44 is preferably made of the same precious metal alloy as the rest of the bushing and the same alloy as the bushing of Example 1, but can be a different alloy so long as it is electrically conductive.

The ear 44 can have a single thickness and preferably is comprised of two parts, first part attached to or integral with the endwall 40 and a second part 26, the unattached end portion. A top surface 46 of the ear 44 and a bottom surface 48 are preferably parallel to each other, but need not be. The top surface 46 can be in a single plane, but preferably is not in a single plane, but rather is in two or more planes.

A vertical centerline of each ear 44 is aligned with the vertical centerline of the endwall 40 it contacts. Each ear 44 is preferably comprises a first part 50 (FIG. 6A) and a second part 52. The first part 50 of the ear 44 can be perpendicular to the endwall 40, but preferably is at an angle with the endwall 40 as shown in FIG. 7, preferably with the angle between the bottom surface 48 of the ear 44 and the exterior surface of the endwall 40 being less than 90 degrees, preferably less than about 75 degrees with about 59 degrees being a particularly preferred contact angle. The second part 52 of the ear 44 is preferably parallel to the tip plate 42, but need not be. The sides 53 of the second part 52 are marked with reference marks 54 to aid in knowing where a leading edge of a terminal connector block (not shown) is located when installing or moving the terminal connector on the ear 44.

The ear 44 has five V shaped notches 58 with the widest part of the V being at the unattached end of the ear 44 opposite the end that ear 44 is attached to the end plate 40. Preferably, the bottom of the V shaped notches 58 are radiased to about 3/32. The number of the V shaped notches, the angle within each V shaped notch and and the length of the V shaped notches can all be varied to obtain the result needed depending on the size of the bushing and the design of the bushing. Side portions 56 of the second part 52 are preferably wider adjacent the wide part of the V shaped notches 58 than the width of ends 60 of the second part 52 between the V shaped notches 58.

EXAMPLE 2

Another preferred bushing 38, made in accordance with FIGS. 6, 6A and 7, was fabricated using conventional precious metal alloy forming and welding techniques using the same alloy as used in Example 1. The bushing 38 was sized in a conventional manner to have about 4030 nozzles or tips 12. The orifice plate 42 had a thickness of about 1.5 mm and the endwalls 40 had a thickness of about 1.4 mm.

One ear 44 was welded onto the exterior of each endwall 40 of the bushing 38 as shown enlarged in FIG. 7. In this Example the ear 44 was made up of the first portion 50 that was about 2.54 mm thick and the second portion 52 that was also about 2.54 mm thick. The length of the second portion 26 was about 28.6 mm long. The reference marks 54 are stamped into the sides 53 of the second portion 52 and spaced apart about 3.175 mm. The enclosed angle of each V shaped notch 58 is preferably about 30 degrees, but the enclosed angles of all of the V shaped notches 58 need not be identical. The centerline of the center V shaped notch 58 aligns with the side-to-side centerline of the ear 44. The distance between the centerline of each outer notch 58 and the side 53 of the side portions 56 of the ear 44 was about 28.5 mm and the distance between the centerlines of each two adjacent notches 58 was about 35.3 mm. The total width of the ear 44 at the unattached end was about 203.2 mm. The length of each notch 58 from the open end at the unattached end of the second portion 52 to the bottom of the radius in the first portion 50 was about 39.7 mm. The total width of ear 44 is about 203 mm.

The ear 44 is bent to form a ⅛ radius on the top surface 46 between the first portion 50 and the second portion 52. The length of the ear 44 is such that the unattached ends 60 are about 50.8 mm from the exterior surface of the endwall 40 when the ear 44 is welded to the endwall 40 as shown in FIG. 7. The ear 44 was attached to the end wall 40 with continuous welds on both the top surface 46 of the ear 44 and also on the bottom surface 48 of the ear 44 as shown in FIG. 7. The bottom surface 48 of the ear 44 formed an angle of about 59 degrees with the outer surface of the end wall 40 when the ear was welded to the end wall 40 as shown.

This 4030 tip bushing having ears 44 as described above performed in a superior manner to prior art 4030 tip bushings having conventional ears in the same positions on a furnace forehearth. The range of control of tip plate temperature profile was greater than prior art bushings, allowing improved tip plate temperature uniformity, elimination of cold corners and higher fiber productivity.

Also, the novel bushing ears described in detail above require several troy ounces less alloy per bushing than prior art ears. At the current value of more than $600 per troy ounce of 78 percent platinum/22 percent rhodium alloy, this improvement amounts to capital savings of hundreds of thousands of dollars to the glass fiber industry. However, the primary objective of the inventive ears is to allow a greater range of adjustment to eliminate or minimize cold corners and to optimize temperature uniformity in the tip plate and not all ear embodiments of the present invention will also produce a reduction in the precious metal weight requirement.

Another advantage of the novel ears of the bushings of the present invention is that the notches allow space for one or more additional clamping bolts in the water cooled terminal clamps or blocks, used to transfer electrical current to the ears, intermediate of its two ends which provides a more uniform clamping pressure on the novel ears of the present invention. This either solves the problem of uneven electrical transfer on terminal blocks having clamping bolts only on each end of the blocks outside the ears or, reduces the weight of the prior art terminal blocks having three or more clamping bolts total, the lighter weight increasing bushing life or further reducing bushing weight.

Figure 8:
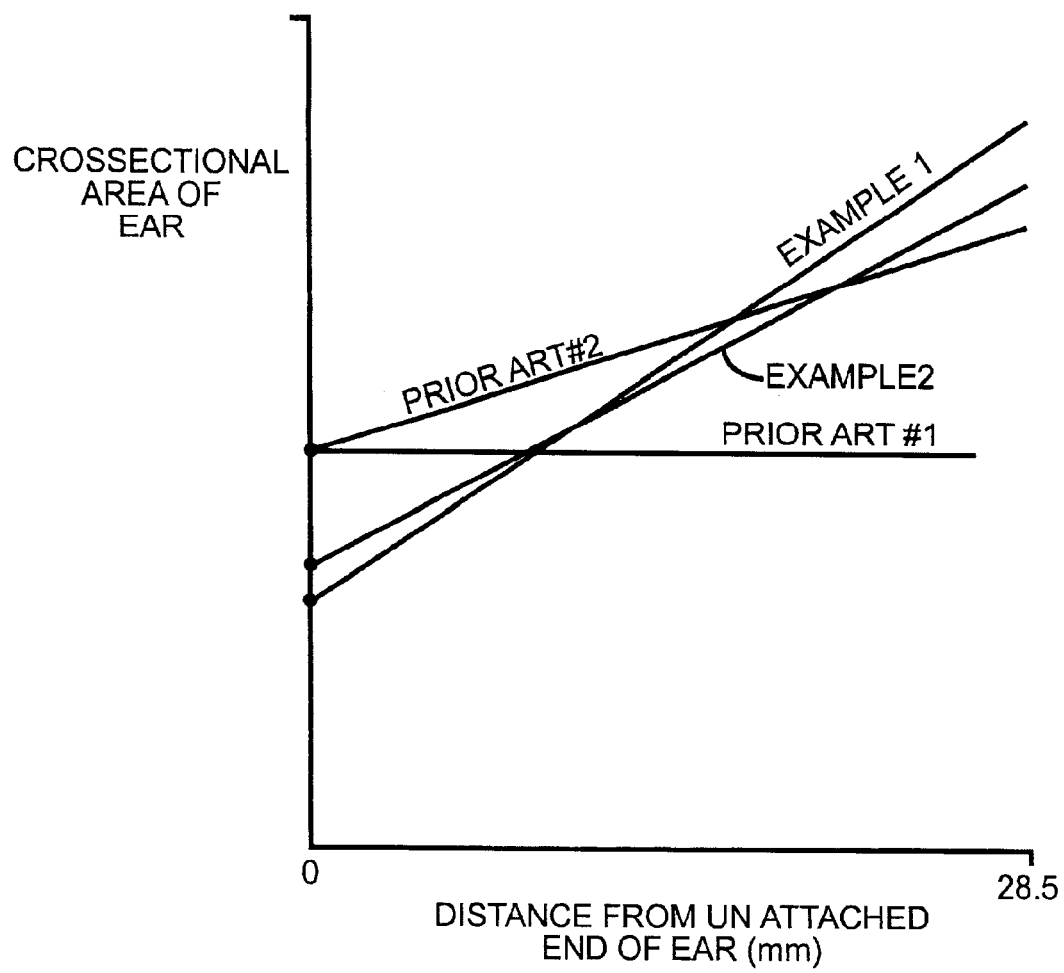
FIG. 8 is a graph showing how the cross sectional area of bushing ear changes along the length of the ears used on the bushings of the present invention starting from the unattached end of the ears and also how the cross sectional area compares to curves of the same variable for two conventional prior art ear designs.

FIG. 8 is a graph showing the substantial difference in the percentage of potential cross sectional area of the ear beginning at the unattached end of the ear and moving along the ear towards the endwall of the bushing for the bushing ears of the present inventive bushings and two conventional prior art bushings. This variable is important because it determines how the current is applied to the ear and the degree to which this power is concentrated to create a heating effect to partially or usually more than totally offset the cooling effect of the water cooled terminal clamp. The flat line of Prior Art bushing #1 is for the bushing 2 shown in FIGS. 1 and 2. Thus, as one would move the terminal block back and forth along the ear 11 of the bushing shown in FIG. 1, the percent of cross sectional area of the ear 11 that the terminal block would contact remains constant, thus the degree of concentration of the current would not change and the only variable would be in the cooling effect of the water cooled terminal clamp block on the electrically heated ear 11, endwall 8 and end of the tip plate 10.

The inclined line in the chart shown in FIG. 8 labeled Prior Art #2 is for a type of bushing ear design like that shown in U.S. Pat. No. 4,272,271. The lowest percent of potential cross sectional area available on this ear begins at about the same level as that of the bushing shown in FIG. 1, but increases to a level depending on the actual design of the terminal block used, but usually to a level that is less than that achievable with the ears of the present invention. Thus the concentration of current does change as the terminal block is moved closer to the endwall, but is limited to significantly above that of the present inventive ears since the terminal clamp cannot be mounted right at the unattached end of the ear.

The inclined lines labeled Example 1 and Example 2 represent the bushings described in Examples 1 and 2 respectively, described above. The slopes of these inclined lines are significantly greater than the slope of inclined line labeled Prior Art #2, and there is a big difference in the range of the percentages of cross sectional area and the degree to which the current can be concentrated to produce the desired heating effect. The bushing ear of Example 1 has a range of cross sectional areas of from about 38 percent more than 78 percent and the bushing ear of Example 2 has a range of cross sectional area of from about 33 percent to more than 86 percent. Thus, the current can be more concentrated, and thus have a higher heating effect, in the second portion close to the terminal clamp, the adjustable portion, of the ears of the bushings of the present invention than the prior art bushings having a minimum cross sectional area of about 53 percent. It is believed that this substantial difference plays a substantial part in producing the superior results in the bushings of the present invention when these bushings are used in glass fiber manufacturing processes such as the processes disclosed in U.S. Pat. No. 5,935,289, the disclosure of which is hereby incorporated herein by reference.

Figure 9:
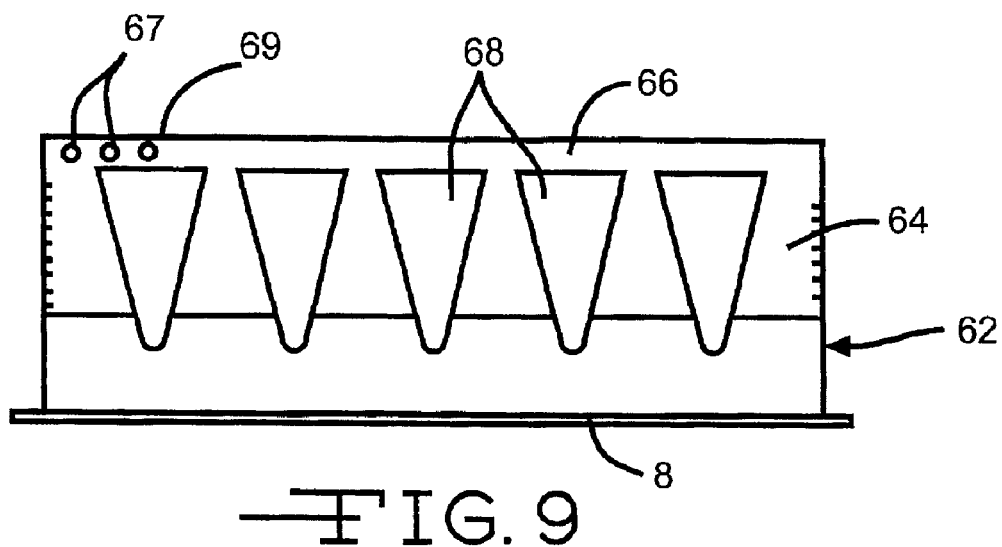
FIGS. 9 and 10 are plan views of two of the many optional inventive embodiments of ears of the present invention.
Figure 10:
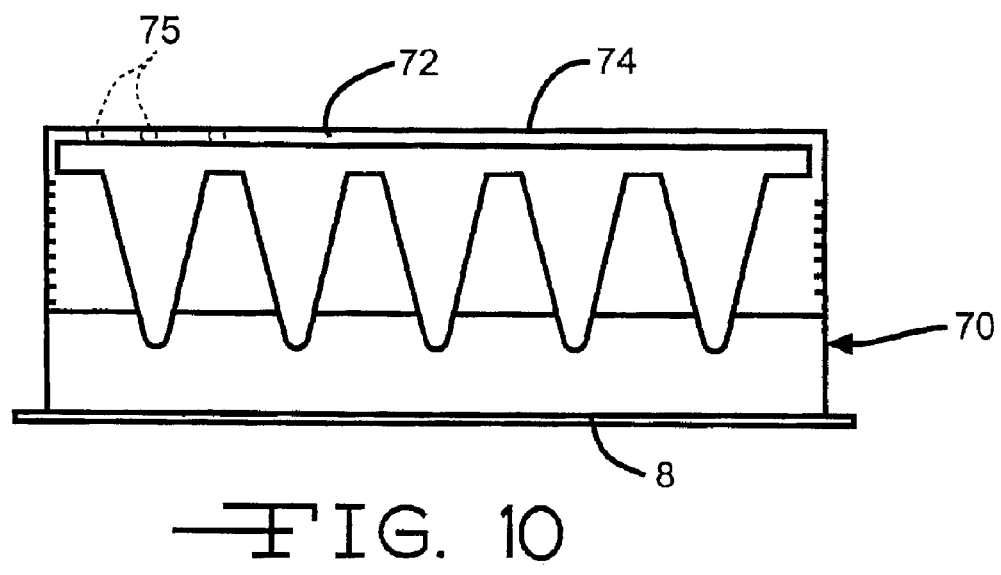

FIGS. 9 and 10 show further embodiments of novel ears of the present invention. Although requiring more precious metal alloy than the novel ears 22 and 44 of Examples 1 and 2 above, the novel ears shown in FIGS. 9 and 10 perform in a similar manner when the terminal blocks are positioned in the area of the multiple notches.

The novel ear 62 shown in FIG. 9, seen in plan view, can be used on any size bushing, but is preferred for use on bushings having 1200 or more tips. This ear 62 is identical to the ear shown in FIG. 3A except for an extension of the length of the second portion 64, providing for a solid end portion 66 beyond the widest part of each V shaped notch 68 and extending the full width of the ear 62 at the unattached end 69. The ear 62 can be made by punching the V shaped notches 68 from a precious metal alloy plate used to make the ear 62. The distance between the widest parts of the V shaped notches 68 and the unattached end 69 is not critical since the terminal block will be located in the area of the V shaped notches 68 and will not necessarily or normally contact the solid end portion 66 in operation of the bushing. Holes 67 can be drilled or punched in the unattached end portion that extends across the ear 62 between the wide ends of the V shaped notches 68 and the unattached end 69 to reduce the weight of the ear 62.

FIG. 10 shows a novel ear 70 that is identical to the novel ear 62 described above except for a modification of a solid end portion 72 adjacent the end 74 to a thinner/lower cross section solid end portion 72 to reduce the amount of precious metal alloy required. The solid end portion 72 can also have holes therethrough in any orientation, e.g. holes 75, to further reduce alloy weight. Again, the distance between the widest part of the V shaped notches and the unattached end 74 is not critical since the terminal block will normally be located in the area of the V shaped notches and will not necessarily or normally contact the solid end portion 72 in operation of the bushing.

Figure 11:
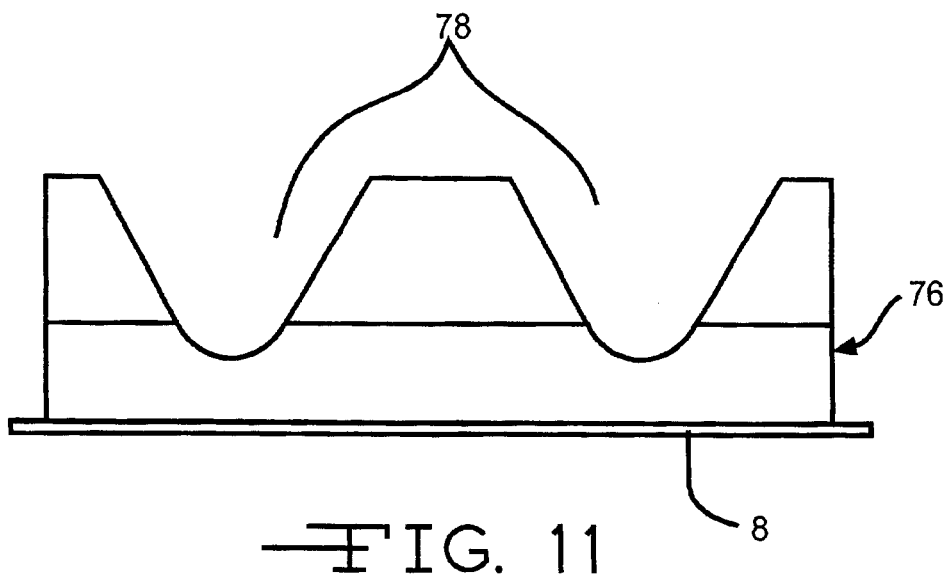
FIG. 11 is a plan view of an ear according the present invention having only two V shaped notches.
Figure 12:
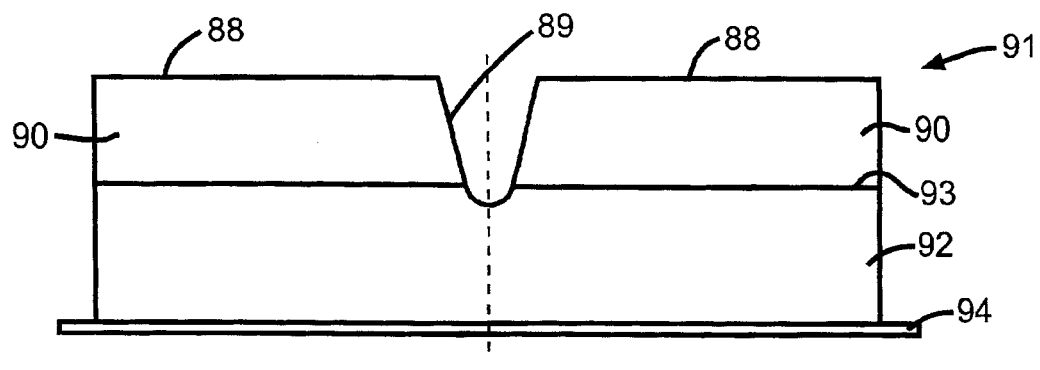
FIG. 12 is a plan view of another ear embodiment according to the present invention having only one V shaped notch.
Figure 13:
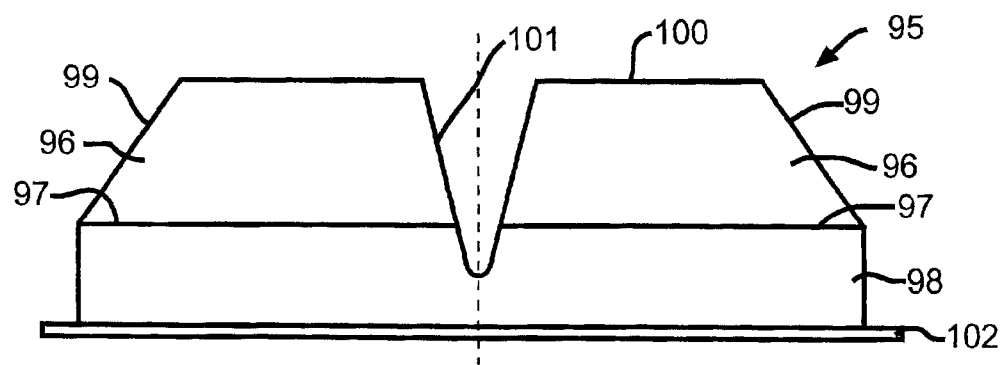
FIG. 13 is a plan view of still another ear embodiment according to the present invention showing the option of tapering the two outside edges such that the ear is narrower at the unattached end than at the end joining the endwall of the bushing.

FIGS. 11, 12 and 13 show a three of the many possible ear embodiments made according to the present invention. These embodiments are particularly useful on smaller fiberizing bushings, i. e. bushings that are narrower and that have fewer tips or orifices, such as bushings having 2200 tips or orifices or less including 1600, 1200 and 800 tip bushings.

FIG. 11 shows a novel ear 76 having two V shaped notches 78 therein in the same orientation as the notches 33 and 58 of ears 22 and 44 respectively, for use on bushings of the present invention. The enclosed angle of the V shaped notches, the radius in the bottom of the V shaped notches and the depth of the V shaped notches are all variables that can be varied to achieve the desired result with the bushing design selected and bushing location on the furnace forehearth or conventional marble melt device and, given the above disclosure, is within the ordinary skill of an artisan to optimize.

While it is preferred to use three or more V shaped notches in each ear, more preferred to use four or more V shaped notches in each ear and most preferred to use five notches in each ear as described above, it is also possible to obtain benefits of the present invention using an ear 91 having only one V shaped notch 89 as shown in FIG. 12. A center line of the V shaped notch 89 and the ear 91 would align with a vertical center line of the endwall 94 to which the ear 91 is attached. This ear has a first part 90 to which a terminal clamp would be connected and containing most of the V shaped notch 89. A second part 92 attaches to the endwall 94. The first part 90 and the second part 92 join at a radiused bend 93. A front view of this ear 91 would look very similar to that of the ear 44 shown in FIG. 7.

FIG. 13 shows an optional outer edge configuration for the ears of the present invention. The ear 95 shown here has, for simplicity sake, only one notch 101 located in the ear 95 as shown in FIG. 13. This ear 95 has first parts 96 that join a second part 98 at a radiused bend 97. The second part 98 is attached to the endwall 102 as described above. The significant difference of the ear 95 is that the outer sides 99 of the first parts 96 are not parallel to the outer sides of the second part 98, but instead taper inward toward the V shaped notch 101. The angle of taper can vary widely to achieve the effects described for the present invention. Following this option will permit the cross sectional area of the ear to be reduced still further at the unattached end or at the wide portion of the V shaped notch.

While the preferred embodiments and some modifications have been disclosed above, the claimed invention is not limited to these specific embodiments, but rather only to the invention described above and claimed below. Also, other embodiments of the present invention will be obvious to the artisan after studying the above disclosure. Therefore, the present invention is described by the following claims and equivalents thereof.

We claim:

1. Electrically resistant-heated fiberizing bushings made from an electrically conductive material and comprising an orifice plate or a tip plate, a wall attached to each end and/or side of the tip plate or orifice plate and two ears spaced apart and integral with or attached to the external surface of the wall(s) of the bushing, each ear for attaching to an electrical terminal clamp, the improvement comprising that each ear contains at least one generally V shaped notch with the widest part of the V shaped notch being at an unattached end of the ear.

2. The bushing of claim 1 wherein the wall comprises two opposed endwalls, and two opposed sidewalls and wherein the cross sectional area of each ear increases from the unattached end of the ear towards the end of the ear that is attached to the wall.

3. The bushing of claim 2 wherein each ear is attached to the external surface of each endwall.

4. The bushing of claim 1 wherein one of the ears is attached to the external surface of a sidewall.

5. The bushing of claim 2 wherein each ear contains at least 3 generally V shaped notches therein.

6. The bushing of claim 2 wherein each ear contains at least 4 generally V shaped notches therein.

7. The bushing of claim 2 wherein each ear contains 2 or more generally V shaped notches therein.

8. The bushing of claim 2 wherein each ear has three or more generally V shaped notches therein with the widest portion of the notch being at an unattached end of the ear.

9. The bushing of claim 8 wherein the distance at the unattached end of the ear from either side of the ear to the side of the closest generally V shaped notch is greater than the distance at the unattached end of the ear between adjacent sides of two of the adjacent generally V shaped notches.

10. The bushing of claim 9 wherein the cross sectional area of each ear at the unattached end is substantially less than 50 percent of what the cross sectional area would be if the ear had no notches.

11. Electrically resistant-heated fiberizing bushings made from an electrically conductive material and comprising an orifice plate or a tip plate, a wall attached to each edge of the tip plate or orifice plate and an ear integral with or attached to the external surface of each of two opposed walls of the bushing for attaching to an electrical terminal clamp, each ear having an increasing cross sectional area along a portion of its length from the unattached end portion towards the wall, the improvement comprising that each ear has two or more generally V shaped notches in the ear with the widest portion of each V shaped notch being near or at the unattached end of the ear with the at least two V shaped notches being located in that portion of the ear that attaches to the electrical terminal clamp.

12. The bushing of claim 11 comprising two opposed endwalls and two opposed sidewalls.

13. The bushing of claim 12 wherein an ear is integral with or attached the external surface of each endwall.

14. The bushing of claim 11 wherein at least one ear is integral with or attached to the external surface of each sidewall.

15. The bushing of claim 13 wherein each ear contains at least 3 generally V shaped notches.

16. The bushing of claim 13 wherein each ear contains at least 4 generally V shaped notches.

17. The bushing of claim 13 wherein each ear contains at least 5 generally V shaped notches.

18. The bushing of claim 17 wherein the distance at the unattached end of the ear from either side of the ear to the side of the closest generally V shaped notch is greater than the distance at the unattached end of the ear between adjacent sides of two generally adjacent generally V shaped notches.

19. The bushing of claim 17 wherein the cross sectional area of each ear at or near the unattached end is substantially less than 50 percent of what the cross sectional area would be if the ear had no notches.

20. The bushing of claim 18 wherein the cross sectional area of each ear at or near the unattached end is substantially less than 50 percent of what the cross sectional area would be if the ear had no notches.

21. The bushing of claim 17 wherein the included angle in each of the generally V shaped notches is in the range of about 15 to about 37 degrees.

22. Electrically resistant-heated fiberizing bushings made from an electrically conductive material and comprising an orifice plate or a tip plate, one or more sidewalls attached to the tip plate and an endwall attached to each end of the tip plate or orifice plate and an ear integral with or attached to the external surface of each endwall or sidewall of the bushing for attaching to an electrical terminal clamp, each ear having an increasing cross sectional area along a portion of its length from the unattached end portion towards the endwall, the improvement comprising that each ear has three or more generally V shaped notches in the ear with the widest portion of each V shaped notch being close to or at the unattached end of the ear.

23. Electrically resistant-heated fiberizing bushings made from an electrically conductive material and comprising an orifice plate or a tip plate, one or more sidewalls attached to the tip plate and an endwall attached to each end of the tip plate or orifice plate and an ear integral with or attached to the external surface of each endwall or sidewall of the bushing for attaching to an electrical terminal clamp, each ear having an increasing cross sectional area along a portion of its length from the unattached end portion towards the endwall, the improvement comprising that each ear has four or more generally V shaped openings or notches in the ear with the widest portion of each V shaped notch being close to or at the unattached end of the ear.

24. The bushing of claim 23 wherein each ear has five generally V shaped openings or notches therein.

25. The bushing of claim 24 wherein the distance at the unattached end of the ear from either side of the ear to the side of the closest generally V shaped notch is greater than the distance at the unattached end of the ear between adjacent sides of two of the generally adjacent generally V shaped notches.

26. The bushing of claim 25 wherein the cross sectional area of each ear at or near the unattached end is substantially less than 50 percent of what the cross sectional area would be if the ear had no notches.

27. The bushing of claim 26 wherein the included angle in each of the generally V shaped notches is in the range of about 15 to about 37 degrees.

28. The bushing of claim 27 wherein the included angle in each of the generally V shaped notches is in the range of about 25 to about 33 degrees.

29. A method of making fibers by passing a molten material through an electrically resistant-heated fiberizing bushing made from an electrically conductive material and comprising an orifice plate or a tip plate, a wall attached to each end or side of the tip plate or orifice plate and an ear integral with or attached to the external surface of each wall of the bushing for attaching to an electrical terminal clamp, to form fibers, the improvement comprising that each ear contains at least two generally V shaped notches therein at or near the unattached end of the ear.

30. The method of claim 29 wherein cross section area of each ear increases from the unattached end towards the end attached to the wall.

31. A method of making fibers from a molten material by passing the molten material through an electrically resistant-heated fiberizing bushing made from an electrically conductive material and comprising an orifice plate or a tip plate, one or more sidewalls attached to the tip plate and an endwall attached to each end of the tip plate or orifice plate and the sidewalls and an ear integral with or attached to the external surface of each endwall or sidewall of the bushing for attaching to an electrical terminal block, each ear having an increasing cross sectional area along a portion of its length from the unattached end portion towards the endwall, to form the fibers, the improvement comprising that each ear has three or more generally V shaped openings or notches in the ear with the widest portion of each V shaped notch being close to or at the unattached end of the ear.

32. A method of making fibers from a molten material by passing the molten material through an electrically resistant-heated fiberizing bushing made from an electrically conductive material and comprising an orifice plate or a tip plate, one or more sidewalls attached to the tip plate and an endwall attached to each end of the tip plate or orifice plate and the sidewalls and an ear integral with or attached to the external surface of each endwall or sidewall of the bushing for attaching to an electrical terminal block, each ear having an increasing cross sectional area along a portion of its length from the unattached end portion towards the endwall, to form the fibers, the improvement comprising that each ear has five or more generally V shaped notches in the ear with the widest portion of each V shaped notch being close to or at the unattached end of the ear, each generally V shaped notch or opening having an included angle in the range of about 15 and 35 degrees, wherein the distance at the unattached end of the ear from either side of the ear to the side of the closest generally V shaped notch or opening is greater than the distance at the unattached end of the ear between adjacent sides of two of the generally adjacent generally V shaped notches and wherein the cross sectional area of each ear at the widest portion of the generally V shaped notches or openings is substantially less than 50 percent of what the cross sectional area would be if the ear had no generally V shaped notches.

* * * * *